Nov. 3, 1953  R. C. LARSEN  2,657,481
TRACTOR MOUNTED LOADING SHOVEL AND SCOOP ATTACHMET
Filed Sept. 6, 1946  2 Sheets-Sheet 1
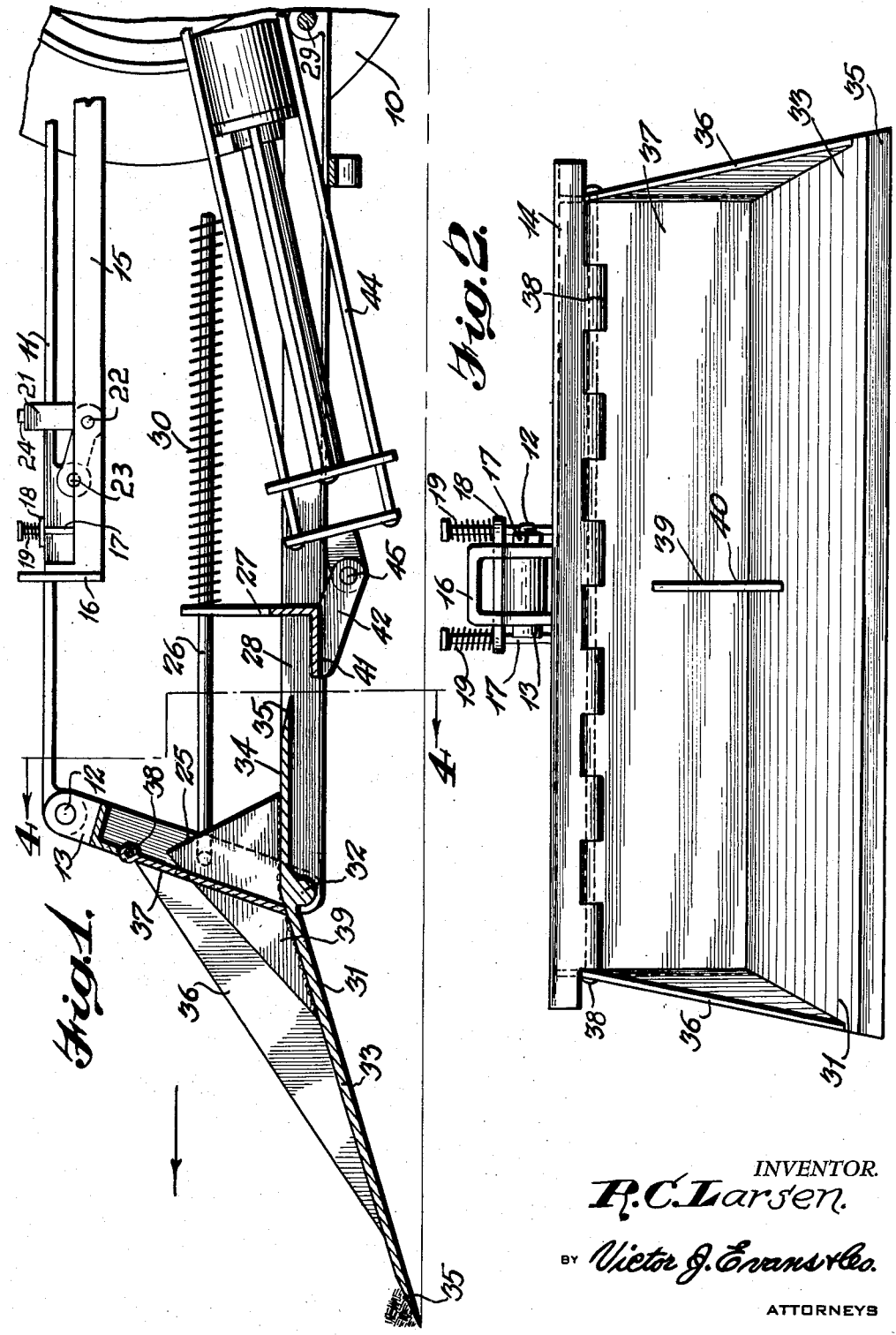
INVENTOR.
R. C. Larsen.
BY Victor J. Evans & Co.
ATTORNEYS

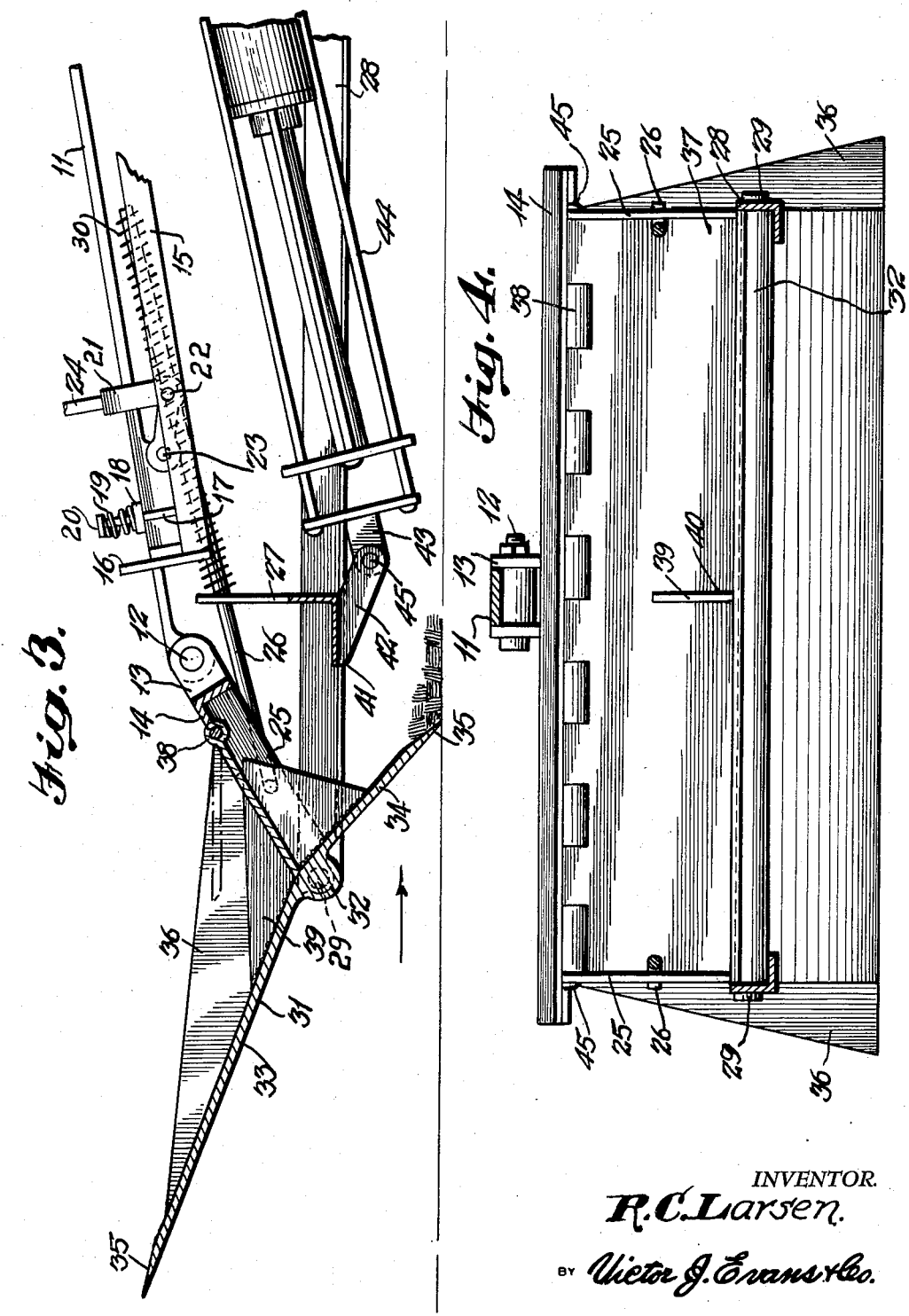

Patented Nov. 3, 1953

2,657,481

UNITED STATES PATENT OFFICE 2,657,481

TRACTOR MOUNTED LOADING SHOVEL AND SCOOP ATTACHMENT

Russell C. Larsen, Kimberly, Idaho

Application September 6, 1946, Serial No. 695,093

3 Claims. (Cl. 37—124)

This invention relates to an improved shovel or scoop attachment for loaders, and more particularly to an attachment of this nature for a loader shown in my Patent 2,311,671.

An object of the invention is to provide an attachment that will operate either while the loader is travelling forward or backward.

Another object of the invention is to provide an attachment which is capable of operating as a bulldozer or land leveler.

A further object of the invention is to provide an attachment that is constructed of a few simple parts, that is durable, efficient, and can be manufactured inexpensively.

With the above and other objects and advantages in view, the invention consists of the novel details of construction, arrangement and combination of parts more fully hereinafter described, claimed and illustrated in the accompanying drawings in which:

Figure 1 is a sectional view of the shovel in position for backward movement of the loader;

Figure 2 is a front view thereof;

Figure 3 is a sectional view of the shovel in position for forward movement of the loader and Figure 4 is a sectional view on the line 4—4 of Figure 1.

Referring now to the drawings wherein like reference characters denote corresponding parts the scoop attachment of this invention includes a trip bar 11 which extends from a tractor, as indicated by the numeral 10, and the bar 11 is pivotally connected by a pin 12 to ears 13 on an angle iron 14 of the scoop frame.

Positioned below the trip bar 11 and parallel thereto are parallel bars 15 that also extend from the tractor, and the bars 15 are pivotally connected to a U-shape yoke 16. Rods 17 extend upwardly from the bars 15 and a pressure plate 18, slidably mounted on the rods 17, is resiliently urged downwardly by springs 19, positioned on the rods 17 and held by nuts 20 on the upper ends of the rods.

The tension of the plate 18 retains the bar 11 in position and holds a tripper 21, which is pivotally mounted by a pin 22 on the bars 15 in position. When the tripper 21 is rocked on the pins 22 the bar 11 is moved against the action of the spring pressed plate 18, freeing the bar 11 for operation in load-dumping operations, similar to that of the bar 11 in the above-noted Patent No. 2,311,671.

Depending from the ends of the bar 14 are vertically inclined end bars 25 of the shovel frame, and rods 26 which are slidably mounted in brackets 27, are pivotally attached to the bars 25 at points intermediate of the length thereof. The brackets 27 are carried by elevating arms 28 which are pivotally connected to the scoop and lower ends of the bars 25 with pins 29. Springs 30 are positioned on the rods 26 between the brackets 27 and holding means on the opposite ends of the rods, not shown.

The scoop 31 is provided with a semi-circular hub 32 which is a continuation of the pins 29, and as shown in Figure 3 the scoop includes a base plate 33 that extends in one direction and a plate 34 that extends in the opposite direction. The plates 33 and 34 are provided with beveled edges 35, as shown.

The side of the scoop on which the plate 33 is positioned is provided with end plates 36 which connect the edges of the plate 33 to the end bars 25. The scoop is also provided with an intermediate gusset plate 39 which extends from the plate 34 to the plate 33. The back of the scoop is provided with a door 37 that is hinged to the angle iron 14 with a pin 38, and the door is provided with a slot 40 that straddles one side of the gusset plate 39.

The elevating arms 28 are connected by an angle 41 from which extends an arm 42, the extended end of which is pivotally connected to an ear 43 of a hydraulic jack or operating device 44, by a pin 45. The jack 44 is adapted to elevate the arms 28 from the position shown in Figure 1 to the position shown in Figure 3.

With the parts as shown in Figure 1, the scoop is positioned with the plate 33 in the scraping position, with the device traveling in the direction of the arrow, and with the parts as shown in Figure 3, the plate 34 is in the scraping position, whereby the device is adapted for use in both directions. With the plate 34 in the scraping position the soil raises the door 37 and passes into the scoop to the plate 33, and after this part of the scoop is filled the the scoop is adjusted to the position shown in Figure 3 and the weight of the soil closes the door. The scoop may also be used without the door as the pin 38 is removable and with this pin removed the door may be removed from the scoop.

Having thus described the invention, what is claimed as new and desired to be obtained by Letters Patent is:

1. In a scoop attachment for a tractor, the combination which comprises a base plate having a beveled end and provided at the opposite end with a hub having pins extended from the ends thereof, vertically inclined end bars positioned at the sides of the plate and in the lower ends of which the said pins are pivotally mounted, triangular shaped end plates connecting the edges of the base plate to said end bars, an angle bar having spaced ears thereon connecting the upper ends of said end bars, another plate also having a beveled edge extended from said hub in a direction opposite to that from which the base plate extends, a door hinged to said angle bar and positioned to provide a closure between the plates of the scoop, said pins extended from the ends of the hub adapted to pivotally mount the scoop between the ends of elevating arms of a tractor with the ears of the angle bar connected to a trip bar of the tractor and with said end bars pivotally connected, at points intermediate of the ends thereof, to rods extended from the tractor.

2. A scoop attachment as described in claim 1, wherein the plate extended from the hub of the scoop is positioned at an acute angle in relation to a plane extended through the base plate of the scoop.

3. A scoop attachment as described in claim 1, wherein an intermediate bar similar to said end bars extends from the angle bar to the hub of the scoop and the intermediate bar is supported from the plates of the scoop with gusset plates and the door is provided with a slot to straddle the said gusset plate connected to the base plate.

RUSSELL C. LARSEN.

References Cited in the file of this patent

UNITED STATES PATENTS

| Number | Name | Date |
| --- | --- | --- |
| 953,406 | Beam | Mar. 29, 1910 |
| 2,076,939 | Cox | Apr. 13, 1937 |
| 2,311,671 | Larsen | Feb. 23, 1943 |